United States Patent
Dunning et al.

(10) Patent No.: US 6,760,307 B2
(45) Date of Patent: *Jul. 6, 2004

(54) METHOD AND APPARATUS FOR CONTROLLING THE FLOW OF DATA BETWEEN SERVERS USING OPTIMISTIC TRANSMITTER

(75) Inventors: David S. Dunning, Portland, OR (US); Richard S. Jensen, Aloha, OR (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/141,134

(22) Filed: Aug. 27, 1998

(65) Prior Publication Data

US 2003/0137939 A1 Jul. 24, 2003

Related U.S. Application Data

(60) Provisional application No. 60/057,221, filed on Aug. 29, 1997, and provisional application No. 60/081,220, filed on Apr. 9, 1998.

(51) Int. Cl.$^7$ .............................................. H04L 12/28
(52) U.S. Cl. ......................... 370/231; 370/389; 370/473
(58) Field of Search ................................. 370/231, 232, 370/230, 216, 218, 228, 357, 389, 390, 400, 410, 412, 428, 473, 474, 294; 714/1, 2; 710/29

(56) References Cited

U.S. PATENT DOCUMENTS

| | | | |
|---|---|---|---|
| 4,839,891 A | * | 6/1989 | Kobayashi et al. .......... 370/231 |
| 5,130,986 A | * | 7/1992 | Doshi et al. ................. 370/231 |
| 5,146,452 A | | 9/1992 | Pekarske |
| 5,222,061 A | | 6/1993 | Doshi et al. |
| 5,260,933 A | | 11/1993 | Rouse |
| 5,303,234 A | | 4/1994 | Kou |
| 5,398,236 A | | 3/1995 | Hemmady et al. |
| 5,459,725 A | | 10/1995 | Bodner et al. |
| 5,809,025 A | | 9/1998 | Timbs |
| 5,875,292 A | | 2/1999 | Taketsugu |
| 5,933,435 A | | 8/1999 | Shah et al. |
| 6,018,515 A | * | 1/2000 | Sorber ........................ 370/229 |
| 6,111,853 A | | 8/2000 | Goodman |
| 6,343,067 B1 | * | 1/2002 | Drottar et al. .............. 370/231 |

OTHER PUBLICATIONS

Rosber et al, "Resequencing Delay and Buffer Occupancy Under the Selective–Repeat ARQ", IEEE, pp. 166–173, 1989.*

(List continued on next page.)

Primary Examiner—Frank Duong
(74) Attorney, Agent, or Firm—Kenyon & Kenyon

(57) ABSTRACT

Link-based flow control requires each link transmitter to retain packets until such time as they are acknowledged by the link receiver. Depending on the type of acknowledge, the transmitter will then either retry or de-allocate the packets. To improve throughput, the present invention includes an optimistic transmitter, which transmits packets without knowing the state of the receiver buffer. By so doing, the present invention improves the latency caused by delays in transit time between nodes. Furthermore, single acknowledgments are used to indicate successful receipt of multiple packets. Single negative acknowledgments are used to indicate successful receipt of all data between a last acknowledged data packet and a packet associated with the negative acknowledgment, which was received with errors.

41 Claims, 1 Drawing Sheet

OTHER PUBLICATIONS

Mohan et al, Efficient Point–to–Point and Point–to–Multipoint Selective–Repeat ARQ Schemes with Multiple Retransmission: A Throughput Analysis, ACM, pp. 49–57, 1988.*

Alexander, Next Generation Input/Output, Computerworld, pp. 1–4, Jul. 26, 1999.*

Bender et al, Understanding Infiniband, Power Solutions, pp. 125–128, Nov. 2002.*

* cited by examiner

METHOD AND APPARATUS FOR CONTROLLING THE FLOW OF DATA BETWEEN SERVERS USING OPTIMISTIC TRANSMITTER

RELATED APPLICATIONS

This application claims priority to U.S. Provisional Application No. 60/057,221, filed on Aug. 29, 1997, entitled "Method and Apparatus for Communicating Between Interconnected Computers, Storage Systems, and Other Input/Output Subsystems" by inventors Ahmet Houssein, Paul A. Grun, Kenneth R. Drottar, and David S. Dunning, and to U.S. Provisional Application No. 60/081,220, filed on Apr. 9, 1998, entitled "Next Generation Input/Output" by inventors Christopher Dodd, Ahmet Houssein, Paul A. Grun, Kenneth R. Drottar, and David S. Dunning. These applications are hereby incorporated by reference as if repeated herein in their entirety, including the drawings. Furthermore, this application is related to U.S. patent application Ser. No. 09/141,151 filed by David S. Dunning and Kenneth R. Drottar on even date herewith and entitled "Method and Apparatus for Controlling the Flow of Data Between Servers." This application is also related to U.S. patent application Ser. No. 09/141,136 filed by Ken Drottar, David S. Dunning and Donald F. Cameron on even date herewith and entitled "Method and Apparatus for Input/Output Link Retry, Failure and Recovery in a Computer Network". This application is also related to U.S. patent application Ser. No. 09/141,136 filed by Ken Drottar, David S. Dunning and Donald F. Cameron on even date herewith and entitled "Method and Apparatus for Input/Output Link Retry, Failure and Recovery in a Computer Network." This application is also related to U.S. patent application Ser. No. 09/141,158 filed by Ken Drottar, David S. Dunning, and Donald F. Cameron on even date herewith and entitled "Method and Apparatus for Failure Recovery in a Computer Network."

BACKGROUND OF THE INVENTION

The present invention relates generally to methods and apparatuses for controlling the flow of data between two nodes (or two points) in a computer network, and more particularly to a method and apparatus for controlling the flow of data between two nodes (or two points) in a system area network.

For the purposes of this application, the term "node" will be used to describe either an origination point of a message or the termination point of a message. The term "point" will be used to refer to an intermediate point in a transmission between two nodes. The present invention includes communications between either a first node and a second node, a node and a switch, which is part of a link, between a first switch and a second switch, which comprise a link, and between a switch and a node.

An existing flow control protocol, known as Stop and Wait ARQ, transmits a data packet and then waits for an acknowledgment (ACK) from the termination node before transmitting the next packet. As data packets flow through the network from node to node, latency becomes a problem. Latency results from the large number of links in the fabric because each packet requires an acknowledgment of successful receipt from the receiving node before the next packet can be sent from the transmitting node. Consequently, there is an inherent delay resulting from the transit time for the acknowledgment to reach the transmitting node from the receiver.

One solution, which is known as Go Back n ARQ, uses sequentially numbered packets, in which a sequence number is sent in the header of the frame containing the packet. In this case, several successive packets are sent up to the limit of the receive buffer, but without waiting for the return of the acknowledgment. According to this protocol, the receiving node only accepts the packets in the correct order and sends request numbers (RN) back to the transmitting node along with the flow control information, such as the state of the receive buffer. The effect of a given request number is to acknowledge all packets prior to the requested packet and to request transmission of the packet associated with the request number. The go back number n is a parameter that determines how many successive packets can be sent from the transmitter in the absence of a request for a new packet. Specifically, the transmitting node is not allowed to send packet i+n before i has been acknowledged (i.e., before i+1 has been requested). Thus, if i is the most recently received request from the receiving node, there is a window of n packets that the transmitter is allowed to send before receiving the next acknowledgment. In this protocol, if there is an error, the entire window must be resent as the receiver will only permit reception of the packets in order. Thus, even if the error lies near the end of the window, the entire window must be retransmitted. This protocol is most suitable for large scaled networks having high probabilities of error. In this protocol, the window size n is based on the size of the receive buffer. Thus, the transmitter does not send more data than the receiver can buffer. Consequently, at start up, the two nodes must transmit information to each other regarding the size of their buffers—defaulting to the smaller of the two buffers during operation.

In an architecture that permits large data packets, unnecessarily retransmitting excess packets can become a significant efficiency concern. For example, retransmitting an entire window of data packets, each on the order of 4 Gigabytes, would be relatively inefficient.

Other known flow control protocols require retransmission of only the packet received in error. This requires the receiver to maintain a buffer of the correctly received packets and to reorder them upon successful receipt of the retransmitted packet. While keeping the bandwidth requirements to a minimum, this protocol significantly complicates the receiver design as compared to that required by Go Back n ARQ.

The present invention is therefore directed to the problem of developing a method and apparatus for controlling the flow of data between nodes in a system area network that improves the efficiency of the communication without overly complicating the processing at the receiving end.

SUMMARY OF THE INVENTION

The present invention provides a method for transmitting data packets from a first endpoint to a second endpoint, either directly or via a fabric. The method of the present invention includes the steps of transmitting the data from a first node in a plurality of packets, and transmitting the data independently of a state of a receive buffer in the second node.

The present invention also provides an apparatus for communicating data between a two endpoints coupled together either directly or via a fabric. The apparatus includes a first switch disposed in a first endpoint, a second switch and a buffer. The second switch can be disposed either in the fabric or in the second endpoint. The first switch transmits the data packets in a plurality of packets from the first endpoint to the second switch independently of a state of a receive buffer in the second switch. The apparatus also includes a buffer located in the first endpoint, which buffer is coupled to the first switch and stores each packet until receiving either an acknowledgment that each packet was successfully received or an error indication that a received version of each packet included at least one error.

DETAILED DESCRIPTION

The present invention provides a simple technique for providing a working network with flow control mechanisms that do not allow for lost data due to congestion, or transient bit errors due to internal or external system noise. The present invention uses an approach to flow control that does not require end-to-end or link-to-link credits, rather the present invention combines this with the ability to detect a corrupted or out of order packet and retry (resend) any/all packets to maintain that all data is delivered uncorrupted, without losing any data and in the order that the data was sent.

The present invention accomplishes this by assigning a sequence number to each packet, performing an error detection on each packet, such as calculating a 32-bit Cyclic Redundancy Check (CRC), and acknowledging (ACK) or negative acknowledging (NAK) each packet at each link within the fabric and not just at the endpoint. According to the prior art, all acknowledgments in a computer network occur at the endpoints, but not within each individual link, i.e., from one intermediate point to another intermediate point, or from one intermediate point to an endpoint, or from one endpoint to an intermediate point.

Figure 1:
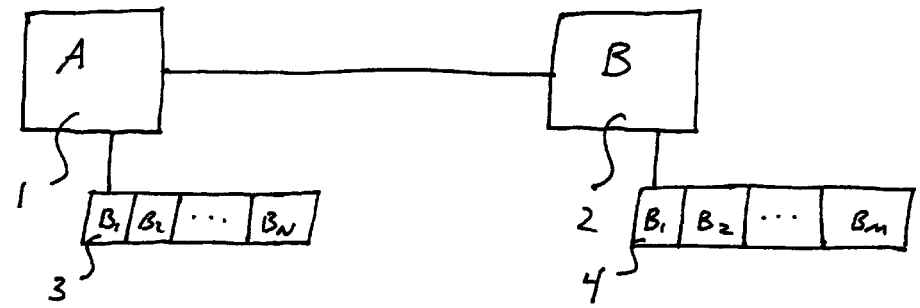
FIG. 1 depicts two nodes communicating directly, to which the method of the present invention is applicable.

The present invention assumes a network built out of point-to-point links. The minimum sized network is two endpoints connected via one link, as depicted in FIG. 1. To simplify our discussion, we will assume a one-way transmission of packets, from endpoint A to endpoint B, except that endpoint B transmits either an ACK or a NAK back to endpoint A. For simplicity sake, two nodes 1, 2 (A and B in FIG. 1) in the network will be used to describe the present invention, noting that the present invention holds for an unlimited sized network. The present invention assumes a send queue and receive queue at each end of each link; however, for simplicity purposes the receive queue at the transmitting end (A) is not shown, and the transmit queue at the receive end (B) is not shown. Thus, in FIG. 1 we show a node A 1, coupled to node B 2 via a link. Node A 1 has a send buffer 3 of length n, and node B 2 has a receive buffer 4 of length in.

For implementation of the present invention, the size of the send queue 3 need not match the size of the receive queue 4 (nor does the send queue of node B (not shown) need to match the size of the receive queue of node A (not shown)). In general, send queues will be larger than receive queues, simply because the system can recover from data lost in a receive queue by retransmitting the data from the send queue, but the opposite is not possible.

In this example, the size of the send queue on node A is defined as n, and the size of receive queue on node B is defined as m. Node 1 is allowed to send up to n packets to the receive queue on node 2 because the sender only knows the size of its queue, as there is no handshaking during power-up. Under congestion-free conditions, packets received at node 2 will be processed and immediately passed on. Node 2 must send back an ACK notifying node 1 that the packets have been received correctly by "ACKing" the sequence number. Note, that as an efficiency improvement to this algorithm, the receiver can ACK multiple packets at one time by ACKing the highest sequence number that has been correctly received, e.g., if the sender receives an ACK for packet #9, then receives an ACK for packet #14, packets #10–#13 are also implicitly ACKed.

In the event of a transient error due to internal or external system noise, data may be corrupted between the sending node (1) and the receiving node (2). The receiving node must calculate the CRC across the data received, and compare it to the CRC appended to the end of the packet. If the calculated CRC and the received CRC match, the packet will be ACKed. If the two CRC's do not match, that packet must be NAKed, again identified by the sequence number. Upon receipt of a NAK, the sender must resend the specified packet again, followed by all packets following that packet. For example, if the sender has sent packets up to sequence number 16 but receives a NAK for packet #14, it must resend packet #14, followed by packet #15 and packet #16. Note that ACKs and NAKs can still be combined. Using the example above, if packet #9 is ACKed, and assuming packets #10–#13 are received in order and without data corruption, followed by packet #14 with corrupted data; a NAK of packet #14 signifies that packets #10–#13 were received without error, but that packet #14 was received with error and must be resent. Also note that the present invention does not force the network to operate in a store and forward fashion.

If congestion in the network occurs, received packets may not be able to immediately make progress through the switch/router. Therefore, when the local buffer space 4 is filled at the receiver B, additional packets will be lost, e.g., when receive buffer 4 fills up, packets that follow will be thrown away. However, given that retry can occur across each link, packets being thrown away is relatively simple to recover from. As soon as the receiver B 2 starts moving packets out of its receive buffer 4, it opens up room for additional packets to be received. The receiver B 2 will check the sequence number of the next packet it receives. In the event that the sender A 1 has sent packets that were dropped on the floor, the first dropped packet will be NAKed and therefore resent from that packet on.

According to the present invention, the send buffer 3 just keeps sending packets until its sender 3 is full of packets that have not been ACKed. It must wait for an ACK for those packets before it can reuse those buffers 3 (it needs to be able to retry those packets if necessary). The present invention does not, however, as in the prior art, stop sending data when the receive queue 4 has filled. The present invention combines the flow control process (i.e., credits) with the error detection process (ACK-NAKing). By eliminating the need for credits to be transmitted, the present invention reduces the overhead of the flow control.

The advantages of the present invention are at least twofold. First, the present invention allows for retry of corrupted packets due to bit error rates on a medium. Second, the present invention implements flow control between two endpoints 1, 2 which will yield better bandwidths for link efficiency than a traditional credit based flow control—a credit base scheme stops sending packets when all credits are used up, and transmission cannot resume until additional credits are received. Whereas, the present invention continues sending data until the receiver sends a NAK, at which time the transmitter restarts at the point at which the receiver indicated the NAK. In the prior art, the time to start and stop data transfer is dependent on the round trip time of the traversing link, which is eliminated in the present invention. The present invention is optimistic in that it sends packets with the expectation that they will be received correctly and is not dependent on the round trip time of the link. In other words, the transmitter of the present invention operates independently of the state of the receiver buffer.

The present invention is also less complex than implementing retry across a link as well as a credit based flow control mechanism. This scheme works regardless of the type of NIC, switch or router architecture used. The hardware necessary to implement these mechanisms is relatively simple, as depicted in FIG. 1.

Figure 2:
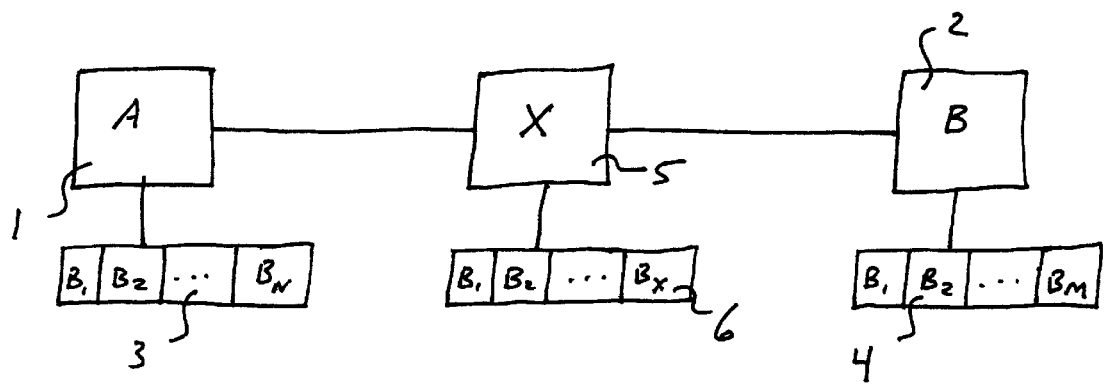
FIG. 2 depicts one exemplary embodiment of the present invention, which includes two nodes communicating via a fabric or switch, to which the method of the present invention is applicable.

The present invention can be used in networks between servers as well as across serial links used for I/O. FIG. 2 depicts two endpoints 1, 2 (or nodes) A and B coupled via a fabric X 5, which has a receive buffer 6. (For purposes of simplicity, buffer 6 will be used as a receive buffer when describing a transmission from A to X, and as a send buffer when describing a transmission from X to B). Fabric X can be a single switch, multiple switches, multiple links, etc. The important distinction is that X includes a send/receive buffer 6, which enables X to ACK/NAK data received from A, and to resend data to B without requiring the data to be resent from A upon receipt of a NAK from B.

Figure 3:
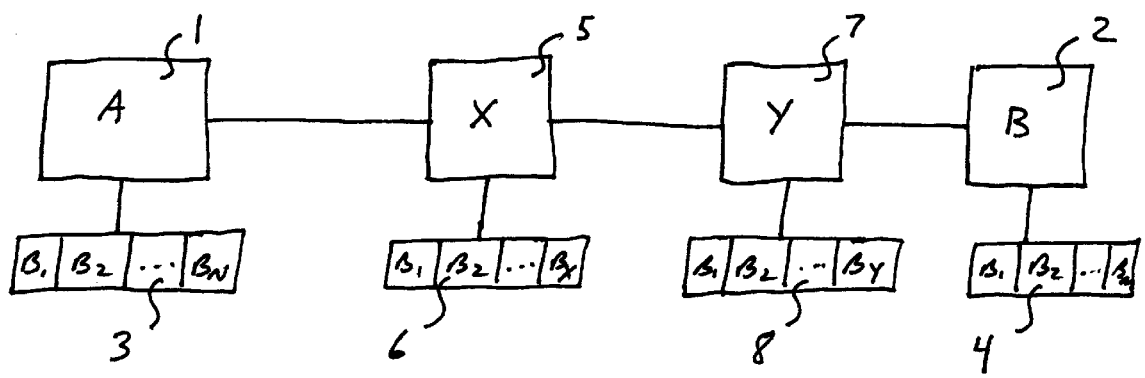
FIG. 3 depicts one exemplary embodiment of the present invention, which includes two nodes communicating via a series of links, to which the method of the present invention is applicable.

FIG. 3 depicts yet another possible embodiment of the present invention. In this case, two intermediate points X and Y include send/receive buffers 6, 8. As discussed above, these buffers 6, 8 enable X and Y to ACK/NAK data between themselves without requiring the data to be resent from the endpoints A and B. If the link between X and Y is particularly noisy, such as a satellite link, then data can be resent from X to Y and from Y to X without notifying A and/or B. Endpoint A may continue sending data to X, while X retries sending data to Y, even though X is throwing the data on the floor, as A will simply continue sending until filling up its send buffer. Once full A will wait until receiving an ACK from X before deallocating packets from its buffer. Once A's buffer is full, A can turn to other tasks while X continues to retry data to Y.

Note that there is a strong trend to move to low voltage differential swing (LVDS) serial links as the most cost effective way to transfer data over zero to tens of meters (potentially kilometers if optical technology is used). That bit error rate combined with that data yields an average occurrence rate of errors too high to use for communication between IA computers without retry and flow control. The present invention is applicable to LVDS bit serial data movement in a reliable environment, including disk adapters/controllers for connection to attached storage devices (NASD) and system area networks (SANs) interprocess communication (IPC).

The present invention adds intelligence to the switches in the fabric, which heretofore have not existed. By enabling the switches in the fabric to include buffers and ACK/NAKing capability, the present invention significantly improves the latency problems in large networks.

What is claimed is:

1. A method comprising:
    a) transmitting data packets from a first node in a plurality of packets; and
    b) transmitting the data packets, independently of a state of a receive buffer in a second node, until the first node fills a send buffer of the first node with data packets that have not yet been acknowledged, said send buffer being larger than said receive buffer;
    c) the first node and the second node being endpoints in a network implemented in compliance with a Next Generation Input/Output flow control process.

2. The method according to claim 1, further comprising:
    c) retaining each data packet in the send buffer at the first node until receiving either an acknowledgment indicating that said each data packet was successfully received by the second node or an error indication that a received version of said each data packet received at the second node included at least one error, while simultaneously transmitting additional packets from the first node.

3. The method according to claim 1, further comprising:
    c) transmitting at least one data packet from the first node after the receive buffer in the second node has filled.

4. The method according to claim 1, further comprising:
    c) transmitting at least one data packet from the first node even though the receive buffer in the second node is in an overflow state.

5. The method according to claim 4, further comprising:
    d) indicating successful receipt of all data packets between a last acknowledged packet and a particular packet by sending a single acknowledgment from the second node to the first node for all said data packets between the last acknowledged packet and the particular packet.

6. The method according to claim 5, further comprising:
   e) de-allocating the particular packet in the send buffer at the first node upon receipt of an acknowledgment associated with the particular packet from the second node; and
   f) de-allocating any other packets in the send buffer at the first node between the particular packet and the last acknowledged packet.

7. The method according to claim 6, further comprising:
   g) retransmitting said each packet and all subsequent packets upon receipt of an error indication from the second node; and
   h) dropping all received packets following said each packet associated with the error indication until successfully receiving a retransmitted version of said each packet from the first node.

8. A method comprising:
   a) transmitting data packets from a first node to at least one switch, independently of a state of a receive buffer in the at least one switch, until the first node fills a send buffer of the first node with data packets that have not yet been acknowledged; and
   b) transmitting the data packets, which were received from the first node, to the a second node from the at least one switch, independently of a state of a receive buffer in the second node, until the at least one switch either receives a negative acknowledgement from the second node or fills a send buffer of the at least one switch with data packets that have not yet been acknowledged, said send buffer being larger than said receive buffer;
   c) the first node and the second node being endpoints in a network implemented in compliance with a Next Generation Input/Output flow control process.

9. The method according to claim 8, further comprising:
   c) retaining each data packet in the send buffer at the first node until receiving either an acknowledgment indicating that said each data packet was successfully received by the at least one switch or an error indication that a received version of said each data packet received at the at least one switch included at least one error, while simultaneously transmitting additional packets from the first node.

10. The method according to claim 8, further comprising:
    c) transmitting at least one data packet from the first node after the receive buffer in the at least one switch has filled.

11. The method according to claim 8, further comprising:
    c) transmitting at least one data packet from the first node even though the receive buffer in the at least one switch is in an overflow state.

12. The method according to claim 11, further comprising:
    d) indicating successful receipt of all data packets between a last acknowledged packet and a particular packet by sending a single acknowledgment from the at least one switch to the first node for all said data packets between the last acknowledged packet and the particular packet.

13. The method according to claim 12, further comprising:
    e) de-allocating the particular packet in the send buffer at the first node upon receipt of an acknowledgment associated with the particular packet from the at least one switch; and
    f) de-allocating any other packets in the send buffer at the first node between the particular packet and the last acknowledged packet.

14. The method according to claim 13, further comprising:
    g) retransmitting said each packet and all subsequent packets upon receipt of an error indication from the at least one switch; and
    h) dropping all received packets following said each packet associated with the error indication until successfully receiving a retransmitted version of said each packet from the first node.

15. A method comprising:
    a) transmitting data packets from a transmitting switch in a fabric to a receiving switch in the fabric; and
    b) transmitting the data packets from the transmitting switch, independently of a state of a receive buffer in the receiving switch, until the transmitting switch fills a send buffer of the transmitting switch with data packets that have not yet been acknowledged, said send buffer being larger than said receive buffer;
    c) the fabric being implemented in compliance with a Next Generation Input/Output flow control process.

16. The method according to claim 15, further comprising:
    c) retaining each data packet in the send buffer at the transmitting switch until receiving either an acknowledgment indicating that said each data packet was successfully received by the receiving switch or an error indication that a received version of said each data packet received at the receiving switch included at least one error, while simultaneously transmitting additional packets from the transmitting switch.

17. The method according to claim 16, further comprising:
    d) indicating successful receipt of all data packets between a last acknowledged packet and a particular packet by sending a single acknowledgment from the receiving switch to the transmitting switch for all said data packets between the last acknowledged packet and the particular packet.

18. The method according to claim 17, further comprising:
    e) de-allocating the particular packet in the send buffer at the transmitting switch upon receipt of an acknowledgment associated with the particular packet from the receiving switch; and
    f) de-allocating any other packets in the send buffer at the transmitting switch between the particular packet and the last acknowledged packet.

19. The method according to claim 18, further comprising:
    g) retransmitting said each packet and all subsequent packets upon receipt of an error indication from the receiving switch; and
    h) dropping all received packets following said each packet associated with the error indication until successfully receiving a retransmitted version of said each packet from the transmitting switch.

20. The method according to claim 15, further comprising transmitting at least one data packet from the transmitting switch after a receiver buffer in the receiving switch has filled.

21. The method according to claim 15, further comprising transmitting at least one data packet from the transmitting switch even though a receiver buffer in the receiving switch is in an overflow state.

22. A machine-readable medium having stored thereon a plurality of executable instructions to perform a method comprising:

a) transmitting data packets from a first node in a plurality of packets; and
  b) transmitting the data packets, independently of a state of a receive buffer in a second node, until the first node fills a send buffer of the first node with data packets that have not yet been acknowledged, said send buffer being larger than said receive buffer;
  c) the first node and the second node being endpoints in a network implemented in compliance with a Next Generation Input/Output flow control process.

23. The machine-readable medium according to claim 22, wherein the method further comprises:

c) retaining each data packet in the send buffer at the first node until receiving either an acknowledgment indicating that said each data packet was successfully received by the second node or an error indication that a received version of said each data packet received at the second node included at least one error, while simultaneously transmitting additional packets from the first node.

24. The machine-readable medium according to claim 23, wherein the method further comprises:

d) indicating successful receipt of all data packets between a last acknowledged packet and a particular packet by sending a single acknowledgment from the second node to the first node for all said data packets between the last acknowledged packet and the particular packet.

25. The machine-readable medium according to claim 24, wherein the method further comprises:

e) de-allocating the particular packet in the send buffer at the first node upon receipt of an acknowledgment associated with the particular packet from the second node; and
  f) de-allocating any other packets in the send buffer at the first node between the particular packet and the last acknowledged packet.

26. The machine-readable medium according to claim 25, wherein the method further comprises:

g) retransmitting said each packet and all subsequent packets upon receipt of an error indication from the second node; and
  h) dropping all received packets following said each packet associated with the error indication until successfully receiving a retransmitted version of said each packet from the first node.

27. The machine-readable medium according to claim 22, wherein the method further comprises:

c) transmitting at least one data packet from the first node after a receiver buffer in the second node has filled.

28. The machine-readable medium according to claim 22, wherein the method further comprises:

c) transmitting at least one data packet from the first node even though a receiver buffer in the second node is in an overflow state.

29. A machine-readable medium having stored thereon a plurality of executable instructions to perform a method comprising:

a) transmitting the data packets from a first node to at least one switch, independently of a state of a receive buffer in the at least one switch, until the first node fills a send buffer of the first node with data packets that have not yet been acknowledged; and
  b) transmitting the data packets, which were received from the first node, to a second node from the at least one switch, independently of a state of a receive buffer in the second node, until the at least one switch either receives a negative acknowledgement from the second node or fills a send buffer of the at least one switch with data packets that have not yet been acknowledged, said send buffer being larger than said receive buffer;
  c) the first node and the second node being endpoints in a network implemented in compliance with a Next Generation Input/Output flow control process.

30. The machine-readable medium according to claim 29, wherein the method further comprises:

c) transmitting at least one data packet from the first node after the receive buffer in the at least one switch has filled.

31. The machine-readable medium according to claim 30, wherein the method further comprises:

d) indicating successful receipt of all data packets between a last acknowledged packet and a particular packet by sending a single acknowledgment from the at least one switch to the first node for all said data packets between the last acknowledged packet and the particular packet.

32. The machine-readable medium according to claim 31, wherein the method further comprises:

e) de-allocating the particular packet in the send buffer at the first node upon receipt of an acknowledgment associated with the particular packet from the at least one switch; and
  f) de-allocating any other packets in the send buffer at the first node between the particular packet and the last acknowledged packet.

33. The machine-readable medium according to claim 32, wherein the method further comprises:

g) retransmitting said each packet and all subsequent packets upon receipt of an error indication from the at least one switch; and
  h) dropping all received packets following said each packet associated with the error indication until successfully receiving a retransmitted version of said each packet from the first node.

34. The machine-readable medium according to claim 29, wherein the method further comprises:

c) transmitting at least one data packet from the first node even though the receive buffer in the at least one switch is in an overflow state.

35. A machine-readable medium having stored thereon a plurality of executable instructions to perform a method comprising:

a) transmitting data packets from a transmitting switch in a fabric to a receiving switch in the fabric; and
  b) transmitting the data packets from the transmitting switch, independently of a state of a receive buffer in the receiving switch, until the transmitting switch fills a send buffer of the transmitting switch with data packets that have not yet been acknowledged, said send buffer being larger than said receive buffer;

c) the fabric being implemented in compliance with a Next Generation Input/Output flow control process.

36. The machine-readable medium according to claim 35, wherein the method further comprises:

c) retaining each data packet in the send buffer at the transmitting switch until receiving either an acknowledgment indicating that said each data packet was successfully received by the receiving switch or an error indication that a received version of said each data packet received at the receiving switch included at least one error, while simultaneously transmitting additional packets from the transmitting switch.

37. The machine-readable medium according to claim 36, wherein the method further comprises:

d) indicating successful receipt of all data packets between a last acknowledged packet and a particular packet by sending a single acknowledgment from the receiving switch to the transmitting switch for all said data packets between the last acknowledged packet and the particular packet.

38. The machine-readable medium according to claim 37, wherein the method further comprises:

e) de-allocating the particular packet in the send buffer at the transmitting switch upon receipt of an acknowledgment associated with the particular packet from the receiving switch; and f) de-allocating any other packets in the send buffer at the transmitting switch between the particular packet and the last acknowledged packet.

39. The machine-readable medium according to claim 38, wherein the method further comprises:

g) retransmitting said each packet and all subsequent packets upon receipt of an error indication from the receiving switch; and h) dropping all received packets following said each packet associated with the error indication until successfully receiving a retransmitted version of said each packet from the transmitting switch.

40. The machine-readable medium according to claim wherein the method further comprises:

transmitting at least one data packet from the transmitting switch after a receiver buffer in the receiving switch has filled.

41. The machine-readable medium according to claim 35, wherein the method further comprises:

transmitting at least one data packet from the transmitting switch even though a receive buffer in the receiving switch is in an overflow state.

* * * * *

UNITED STATES PATENT AND TRADEMARK OFFICE
CERTIFICATE OF CORRECTION

PATENT NO. : 6,760,307 B2
DATED : July 6, 2004
INVENTOR(S) : David S. Dunning et al.

Page 1 of 1

It is certified that error appears in the above-identified patent and that said Letters Patent is hereby corrected as shown below:

Column 7,
Line 24, "to the a second node" should be -- to a second node --.

Signed and Sealed this

Eighth Day of November, 2005

JON W. DUDAS
*Director of the United States Patent and Trademark Office*